United States Patent [19]

Perkins et al.

[11] Patent Number: 5,178,932
[45] Date of Patent: Jan. 12, 1993

[54] THREE-LAYER NONWOVEN COMPOSITE STRUCTURE

[75] Inventors: Cheryl A. Perkins, Roswell; David C. Potts, Dunwoody; Michael D. Powers, Woodstock, all of Ga.

[73] Assignee: Kimberly-Clark Corporation, Neenah, Wis.

[21] Appl. No.: 900,203

[22] Filed: Jun. 17, 1992

Related U.S. Application Data

[63] Continuation-in-part of Ser. No. 618,352, Nov. 26, 1990, Pat. No. 5,145,727.

[51] Int. Cl.$^5$ .................. B32B 5/24; B32B 31/20; B32B 33/00; D04H 3/14; D04H 3/16
[52] U.S. Cl. .................. 428/198; 15/209.1; 15/223; 156/62.4; 156/62.6; 156/62.8; 156/281; 156/308.4; 428/286; 428/287; 428/288; 428/296; 428/302; 428/409; 428/422; 428/447
[58] Field of Search ............ 15/209.1, 223; 156/62.4, 62.6, 62.8, 308.4, 281; 428/198, 286, 287, 288, 296, 302, 409, 422, 447

[56] References Cited

U.S. PATENT DOCUMENTS

| | | | |
|---|---|---|---|
| Re. 32, 514 | 10/1987 | Steklenski | 524/32 |
| D. 239,566 | 4/1976 | Vogt | D59/2 R |
| D. 264,512 | 5/1982 | Rogers | D59/2 R |
| 3,016,599 | 1/1962 | Perry, Jr. | 28/78 |
| 3,341,394 | 9/1967 | Kinney | 161/72 |
| 3,652,374 | 3/1972 | Condon | 428/107 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,738,884 | 6/1973 | Soehngen | 156/167 |
| 3,755,527 | 8/1973 | Keller et al. | 264/210 F |
| 3,770,562 | 11/1973 | Newman | 161/156 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,855,046 | 12/1974 | Hansen et al. | 428/198 |
| 3,926,873 | 12/1975 | Aishima et al. | 525/36 |
| 3,969,313 | 7/1976 | Aishima et al. | 523/202 |
| 3,973,068 | 8/1976 | Weber | 28/198 |
| 3,978,185 | 8/1976 | Buntin et al. | 264/93 |
| 4,039,711 | 8/1977 | Newman | 428/286 |
| 4,041,203 | 8/1977 | Brock et al. | 428/157 |
| 4,064,605 | 12/1977 | Akiyama et al. | 28/103 |
| 4,070,218 | 1/1978 | Weber | 156/167 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,104,340 | 8/1978 | Ward | 264/6 |
| 4,118,531 | 10/1978 | Hauser | 428/224 |
| 4,196,245 | 4/1980 | Kitson et al. | 428/198 |
| 4,287,251 | 9/1981 | King et al. | 428/198 |
| 4,340,563 | 7/1982 | Appel et al. | 264/518 |
| 4,374,888 | 2/1983 | Bornslaeger | 428/198 |
| 4,375,718 | 3/1983 | Wadsworth | 29/592 |

(List continue on next page.)

FOREIGN PATENT DOCUMENTS

| | | |
|---|---|---|
| 1049682 | 2/1979 | Canada . |
| 0260011A2 | 3/1988 | European Pat. Off. . |
| 2506667 | 12/1975 | Fed. Rep. of Germany . |
| 61/155437 | 7/1986 | Japan . |
| GB87/00211 | 10/1987 | PCT Int'l Appl. . |

OTHER PUBLICATIONS

*Chemical and Engineering News*, Jul. 16, 1990, pp. 28–29.

D. R. Thompson et al., "New Fluorochemicals for Protective Clothing," INDA-TEC 90 Conference, Jun. 5–8, 1990.

*Chem. Abstr.*, 105:192786s (1986).

*Chem. Abstr.*, 84:91066z (1976).

R. H. Somani and M. T. Shaw, *Macromolecules*, 14, 886–888 (1981).

S. N. Pandit et al., *Polymer Composites*, 2, 68–74 (1981).

V. A. Wente, "Superfine Thermoplastic Fibers," *Industrial and Engineering Chemistry*, vol. 48, No. 8, pp. 1342–1346 (1956).

(List continued on next page.)

*Primary Examiner*—James C. Cannon
*Attorney, Agent, or Firm*—William E. Maycock

[57] ABSTRACT

A nonwoven composite structure is provided which has three melt-extruded nonwoven layers, each of which includes at least a portion of a nonwoven web. The first nonwoven web is adjacent to one surface of the second nonwoven web and the third nonwoven web is adjacent to the other surface of the second nonwoven web. The first and third nonwoven webs consist of continuous and randomly deposited filaments having an average filament diameter in excess of about 7 micrometers. The second nonwoven web consists of substantially continuous and randomly deposited microfibers having an average diameter of from about 0.1 to about 10 micrometers. The microfibers of the second nonwoven web are prepared from a mixture of an additive and a second thermoplastic polymer, which additive imparts alcohol repellency to the surfaces of the microfibers. The three nonwoven layers can be prepared independently from polyolefins, polyesters, polyetheresters, and polyamides. The boundary between at least two adjacent melt-extruded nonwoven layers is indistinct in that fibers at or near the surfaces of such adjacent layers are significantly intermingled. At least one of the first and third nonwoven webs has been treated by topical application of at least one agent to alter or enhance the surface characteristics of the filaments in the web, the topical treatment being carried out in a manner such that each topically applied agent is substantially restricted to the web to which it was applied. Finally, the composite structure has been pattern bonded by the application of heat and pressure.

24 Claims, No Drawings

U.S. PATENT DOCUMENTS

| | | | |
|---|---|---|---|
| 4,377,615 | 3/1983 | Suzuki et al. | 428/213 |
| 4,405,297 | 9/1983 | Appel et al. | 425/72 S |
| 4,434,204 | 2/1984 | Hartman | 428/198 |
| 4,436,780 | 3/1984 | Hotchkiss et al. | 428/198 |
| 4,446,090 | 5/1984 | Lovgren et al. | 264/211 |
| 4,480,009 | 10/1984 | Berger | 428/447 |
| 4,493,868 | 1/1985 | Meitner | 428/171 |
| 4,499,149 | 2/1985 | Berger | 428/447 |
| 4,508,113 | 4/1985 | Malaney | 128/132 D |
| 4,535,113 | 8/1985 | Foster et al. | 524/262 |
| 4,555,811 | 12/1985 | Shimalla | 2/51 |
| 4,578,414 | 3/1986 | Sawyer et al. | 524/310 |
| 4,588,457 | 5/1986 | Crenshaw et al. | 156/62.8 |
| 4,604,313 | 8/1986 | McFarland et al. | 428/172 |
| 4,610,915 | 9/1986 | Crenshaw et al. | 428/219 |
| 4,618,524 | 10/1986 | Groitzsch et al. | 428/198 |
| 4,627,811 | 12/1986 | Greiser et al. | 425/72 S |
| 4,644,045 | 2/1987 | Fowells | 526/348 |
| 4,652,489 | 3/1987 | Crass et al. | 428/337 |
| 4,655,757 | 4/1987 | McFarland et al. | 604/366 |
| 4,659,777 | 4/1987 | Riffle et al. | 525/100 |
| 4,663,220 | 5/1987 | Wisneski et al. | 428/221 |
| 4,668,566 | 5/1987 | Braun | 428/286 |
| 4,689,362 | 8/1987 | Dexter | 524/266 |
| 4,698,388 | 10/1987 | Ohmura et al. | 525/88 |
| 4,714,647 | 12/1987 | Shipp et al. | 428/212 |
| 4,724,114 | 2/1988 | McFarland et al. | 264/510 |
| 4,745,142 | 5/1988 | Ohwaki et al. | 524/87 |
| 4,753,843 | 6/1988 | Cook et al. | 428/286 |
| 4,761,322 | 8/1988 | Raley | 428/198 |
| 4,766,029 | 8/1988 | Brock et al. | 428/286 |
| 4,772,510 | 9/1988 | McClure | 428/286 |
| 4,778,460 | 10/1988 | Braun et al. | 604/380 |
| 4,784,892 | 11/1988 | Storey et al. | 428/172 |
| 4,818,585 | 4/1989 | Shipp, Jr. | 428/198 |
| 4,818,597 | 4/1989 | DaPonte et al. | 428/284 |
| 4,855,360 | 8/1989 | Duchesne et al. | 525/187 |
| 4,857,251 | 8/1989 | Nohr et al. | 264/103 |
| 4,863,983 | 9/1989 | Johnson et al. | 524/140 |
| 4,904,521 | 2/1990 | Johnson et al. | 428/284 |
| 4,906,513 | 3/1990 | Kebell et al. | 428/198 |
| 4,923,914 | 5/1990 | Nohr et al. | 524/99 |
| 5,145,727 | 9/1992 | Potts et al. | 428/198 |

OTHER PUBLICATIONS

V. A. Wente et al., "Manufacture of Superfine Organic Fibers," Navy Research Laboratory, Washington, D.C., NRL Report No. 4364.

R. R. Buntin and D. T. Lohkamp, *Journal of the Technical Association of the Pulp and Paper Industry*, vol. 56, pp. 74–77 (1973).

THREE-LAYER NONWOVEN COMPOSITE STRUCTURE

This is a continuation-in-part of Application Ser. No. 07/618,352, filed Nov. 26, 1990 in the names of David C. Potts, George A. Young, Dennis S., Everhart, J. Gavin MacDonald, and Ronald S. Nohr, and now U.S. Pat. No. 5,145,727.

BACKGROUND OF THE INVENTION

The parent application describes a nonwoven composite structure having at least two melt-extruded nonwoven layers, i.e., a nonwoven composite structure having at least two melt-extruded layers in which the fibers of at least one layer are prepared by melt extrusion of a mixture of an additive and a thermoplastic polymer, which additive imparts to the surfaces of the fibers, as a consequence of the preferential migration of the additive to the surfaces of the fibers as they are formed, at least one characteristic which is different from the surface characteristics of fibers prepared from the thermoplastic polymer alone.

The multilayered structures described in such parent application possess various distinct advantages over earlier structures. It subsequently was unexpectedly discovered, however, that not all combinations of fiber surface characteristics performed equally well. This was particularly true for three-layer nonwoven composite structures where the center layer contained an additive which imparted alcohol repellency to the fibers thereof and both alcohol repellency and electrostatic charge dissipation were desired for the composite structure.

SUMMARY OF THE INVENTION

It therefore is an object of the present invention to provide an improved alcohol repellent and antistatic three-layer nonwoven composite structure.

It also is an object of the present invention to provide a method for preparing such a structure.

Another object of the present invention is to provide an article of manufacture which includes such a structure.

These and other objects will be apparent to one having ordinary skill in the art from a consideration of the specification and claims which follow.

Accordingly, the present invention provides an improved nonwoven composite structure having three melt-extruded nonwoven layers which includes:

(A) a first layer which includes at least a portion of a first nonwoven web;

(B) a second layer which includes at least a portion of a second nonwoven web having a first surface and a second surface; and (C) a third layer which includes at least a portion of a third nonwoven web; in which:

(1) the first nonwoven web is adjacent to the first surface of the second nonwoven web and the third nonwoven web is adjacent to the second surface of the second nonwoven web;

(2) the first nonwoven web is comprised of continuous and randomly deposited filaments having an average filament diameter in excess of about 7 micrometers and prepared from a first thermoplastic polymer which is selected from the group consisting of polyolefins, polyesters, polyetheresters, and polyamides;

(3) the second nonwoven web includes substantially continuous and randomly deposited microfibers having an average diameter of from about 0.1 to about 10 micrometers;

(4) the microfibers of the second nonwoven web are prepared by melt extrusion through a die at a shear rate of from about 50 to about 30,000 sec$^{-1}$ and a throughput of no more than about 6.4 kg/cm/hour of a mixture of an additive and a second thermoplastic polymer, which additive imparts alcohol repellency to the surfaces of the microfibers as a consequence of the preferential migration of the additive to the surfaces of the microfibers as they are formed, such preferential migration taking place spontaneously upon the formation of the microfibers without the need for a post-formation treatment of any kind;

(5) the additive is present in the second nonwoven web in an amount which is sufficient to both impart alcohol repellency to the microfibers thereof and to substantially prevent entry into the second nonwoven web of topically applied treatment liquid;

(6) the second thermoplastic polymer is selected from the group consisting of polyolefins, polyesters, polyetheresters, and polyamides;

(7) the third nonwoven web includes continuous and randomly deposited filaments having an average filament diameter in excess of about 7 micrometers and prepared from a third thermoplastic polymer which is selected from the group consisting of polyolefins, polyesters, polyetheresters, and polyamides;

(8) the boundary between at least two adjacent melt-extruded nonwoven layers is indistinct in that fibers at or near the surfaces of such adjacent layers are significantly intermingled;

(9) the composite structure has been pattern bonded by the application of heat and pressure; and

(10) at least one of the first and third nonwoven webs has been treated by topical application of at least one agent in an amount which is sufficient to impart to the filaments of such web at least one characteristic which is different from the surface characteristics of filaments in a web not so treated, such topical treatment being carried out in a manner such that each topically applied agent is substantially restricted to the web to which it was applied.

The present invention also provides a method of preparing an improved nonwoven composite structure having three melt-extruded nonwoven layers adjacent to each other in which each melt-extruded nonwoven layer includes at least a portion of a nonwoven web and the boundary between any two adjacent melt-extruded nonwoven layers is indistinct in that fibers or filaments at or near the surfaces of such adjacent layers are significantly intermingled, which method includes the steps of:

(A) forming a first nonwoven web by melt extruding continuous filaments which are randomly deposited on a moving foraminous support, such continuous filaments having an average filament diameter in excess of about 7 micrometers and being prepared from a first thermoplastic polymer which is selected from the group consisting of polyolefins, polyesters, polyetheresters, and polyamides;

(B) forming a second nonwoven web by melt extruding substantially continuous microfibers which are randomly deposited directly onto at least a portion of the first nonwoven web, such substantially continuous microfibers having an average diameter of from about 0.1 to about 10 micrometers;

(C) forming a third nonwoven web by melt extruding continuous filaments which are randomly deposited directly onto at least a portion of the second nonwoven web, such continuous filaments having an average filament diameter in excess of about 7 micrometers and being prepared from a first thermoplastic polymer which is selected from the group consisting of polyolefins, polyesters, polyetheresters, and polyamides;

(D) pattern bonding the resulting structure by the application of heat and pressure; and (E) treating at least one of the first and third nonwoven webs of the resulting pattern bonded structure by topical application of at least one agent in an amount which is sufficient to impart to the filaments of such web at least one characteristic which is different from the surface characteristics of filaments in a web not so treated, such topical treatment being carried out in a manner such that each topically applied agent is substantially restricted to the web to which it was applied; in which:

(1) the microfibers of the second nonwoven web are prepared by melt extrusion through a die at a shear rate of from about 50 to about 30,000 sec$^{-1}$ and a throughput of no more than about 6.4 kg/cm/hour of a mixture of an additive and a second thermoplastic polymer, which additive imparts alcohol repellency to the surfaces of the microfibers as a consequence of the preferential migration of the additive to the surfaces of the microfibers as they are formed, such preferential migration taking place spontaneously upon the formation of the microfibers without the need for a post-formation treatment of any kind;

(2) the additive is present in the second nonwoven web in an amount which is sufficient to both impart alcohol repellency to the microfibers thereof and to substantially prevent entry into the second nonwoven web of topically applied treatment liquid; and (3) the second thermoplastic polymer is selected from the group consisting of polyolefins, polyesters, polyetheresters, and polyamides.

The present invention further provides a method of preparing an improved nonwoven composite structure having three melt-extruded nonwoven layers adjacent to each other in which each melt-extruded nonwoven layer comprises at least a portion of a nonwoven web and the boundary between at least two adjacent melt-extruded nonwoven layers is indistinct in that fibers or filaments at or near the surfaces of such adjacent layers are significantly intermingled, which method includes the steps of:

(A) forming a first nonwoven web by melt extruding continuous filaments which are randomly deposited on a moving foraminous support, such continuous filaments having an average filament diameter in excess of about 7 micrometers and being prepared from a first thermoplastic polymer which is selected from the group consisting of polyolefins, polyesters, polyetheresters, and polyamides;

(B) placing a preformed second nonwoven web directly onto at least a portion of the first nonwoven web, such second nonwoven web having been formed by melt extruding substantially continuous microfibers which are randomly deposited, such substantially continuous microfibers having an average diameter of from about 0.1 to about 10 micrometers;

(C) forming a third nonwoven web by melt extruding continuous filaments which are randomly deposited directly onto at least a portion of the second nonwoven web, such continuous filaments having an average filament diameter in excess of about 7 micrometers and being prepared from a third thermoplastic polymer which is selected from the group consisting of polyolefins, polyesters, polyetheresters, and polyamides;

(D) pattern bonding the resulting structure by the application of heat and pressure; and (E) treating at least one of the first and third nonwoven webs of the resulting pattern bonded nonwoven composite structure by topical application of at least one agent in an amount which is sufficient to impart to the filaments of such web at least one characteristic which is different from the surface characteristics of filaments in a web not so treated, such topical treatment being carried out in a manner such that each topically applied agent is substantially restricted to the web to which it was applied; in which (1) the microfibers of the second nonwoven web are prepared by melt extrusion through a die at a shear rate of from about 50 to about 30,000 sec$^{-1}$ and a throughput of no more than about 6.4 kg/cm/hour of a mixture of an additive and a second thermoplastic polymer, which additive imparts alcohol repellency to the surfaces of the microfibers as a consequence of the preferential migration of the additive to the surfaces of the microfibers as they are formed, such preferential migration taking place spontaneously upon the formation of the microfibers without the need for a post-formation treatment of any kind;

(2) the additive is present in the second nonwoven web in an amount which is sufficient to both impart alcohol repellency to the microfibers thereof and to substantially prevent entry into the second nonwoven web of topically applied treatment liquid; and (3) the second thermoplastic polymer is selected from the group consisting of polyolefins, polyesters, polyetheresters, and polyamides.

In preferred embodiments, each of the first, second, and third thermoplastic polymers is a polyolefin or a polyester. Polyolefins are more preferred, with the preferred polyolefins being polyethylene and polypropylene.

DETAILED DESCRIPTION OF THE INVENTION

As used herein, the term "nonwoven composite structure" is meant to define a structure composed predominantly of melt-extruded nonwoven webs. Layers other than melt-extruded nonwoven webs can be present, however. For example, one or more layers of scrim or similar material may be present to add increased strength to the nonwoven composite structure.

The term "melt-extruded" as applied to a nonwoven layer is meant to include a nonwoven layer or web prepared by any melt-extrusion process for forming a nonwoven web in which melt-extrusion to form fibers is followed concurrently by web formation on a foraminous support. The term includes, among others, such well-known processes as meltblowing, coforming, spunbonding, and the like. By way of illustration only, such processes are exemplified by the following references:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342-1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing - A One-Step Web Process for New Nonwoven Products", *Journal of the Technical Association of the Pulp and Paper Industry*, Vol. 56, No.4, pp. 74-77 (1973);

(b) coforming references (i.e., references disclosing a meltblowing process in which fibers or particles are comingled with the meltblown fibers as they are formed) include U.S. Pat. Nos. 4,100,324 to R. A. Anderson et al. and 4,118,531 to E. R. Hauser; and spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

As already stated, the nonwoven composite structure of the present invention has three melt-extruded nonwoven layers, i.e., a first layer which includes at least a portion of a first nonwoven web; a second layer which includes at least a portion of a second nonwoven web having a first surface and a second surface; and a third layer which includes at least a portion of a third nonwoven web. The first nonwoven web is adjacent to the first surface of the second nonwoven web and the third nonwoven web is adjacent to the second surface of the second nonwoven web. Because none of the three layers need be coterminous with each other or with any other layer which may be present, each layer is defined as including at least a portion of a nonwoven web.

In general, the required three nonwoven layers or webs are formed by melt extrusion of a thermoplastic polymer. As used herein, the term "thermoplastic polymer" is meant to include a single polymer; blends or mixtures of two or more polymers of the same type or of different types; copolymers, including random, block, or graft copolymers; and the like.

In each case, the thermoplastic polymer is selected from the group consisting of polyolefins, polyesters, polyetheresters, and polyamides. Examples of suitable thermoplastic polymers include, by way of illustration only, such polyolefins as polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; such polyesters as poly(ethylene terephthalate), poly(tetramethylene terephthalate), poly(cyclohexylene-1,4-dimethylene terephthalate) or poly(oxymethylene-1,4-cyclohexylenemethyleneoxyterephthaloyl), and the like; such polyetheresters as poly(oxyethylene)-poly(butylene terephthalate), poly(oxytrimethylene)-poly(butylene terephthalate), poly(oxytetramethylene)-poly(butyleneterephthalate), poly(oxytetramethylene)-poly(ethylene terephthalate), and the like; and such polyamides as poly(6-aminocaproic acid) or poly(,-caprolactam), poly(hexamethylene adipamide), poly(hexamethylene sebacamide), poly(11-aminoundecanoic acid), and the like.

The thermoplastic polymer preferably is selected from the group consisting of polyolefins and polyesters. Polyolefins are more preferred. Even more preferred are those polyolefins which contain only hydrogen and carbon atoms and which are prepared by the addition polymerization of one or more unsaturated monomers. Examples of such polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. The most preferred polyolefins are polypropylene and polyethylene.

The first layer and the second layer must be adjacent to each other, and the second layer and the third layer must be adjacent to each other. Thus, the second layer is sandwiched between the first and third layers. As used herein, the term "adjacent" means that one surface of one layer is substantially contiguous with a surface of the other layer. However, a layer of scrim or similar material can be present between any two layers since the large open areas inherent in a scrim material permit such layers to be substantially contiguous with each other.

In addition, the boundary between at least two adjacent melt-extruded nonwoven layers must be indistinct in that fibers at or near the surfaces of such layers are significantly intermingled. Such intermingling is simply the natural result of forming one melt-extruded nonwoven web directly on top of another melt-extruded nonwoven web. This requisite intermingling is illustrated by the parent application which is incorporated herein by reference.

In addition to the foregoing intermingling requirement, the microfibers of the second layer are prepared by melt extrusion through a die at a shear rate of from about 50 to about 30,000 sec$^{-1}$ and a throughput of no more than about 6.4 kg/cm/hour of a mixture of an additive and a thermoplastic polymer, which additive (a) imparts alcohol repellency to the surfaces of the microfibers as a consequence of the preferential migration of the additive to the surfaces of the microfibers as they are formed, such preferential migration taking place spontaneously upon the formation of the microfibers without the need for a post-formation treatment of any kind; and (b) is present in an amount which is sufficient to both impart alcohol repellency to the microfibers of the second web and to substantially prevent entry into the second web of topically applied treatment liquid.

As a practical matter, the additive will be present in the second web at a level of from about 0.05 to about 10 percent by weight, based on the amount of thermoplastic polymer. The additive preferably will be present at a level of from about 0.5 to about 2.5 percent by weight, based on the amount of thermoplastic polymer.

As stated above, microfibers are formed by extruding the molten mixture through a die. Although the nature of the die is not known to be critical, it most often will have a plurality of orifices arranged in one or more rows extending the full machine width. Such orifices may be circular or noncircular in cross-section. The microfibers extruded are substantially continuous. As used herein, "substantially continuous microfibers" refers to microfibers which are of a length such that they can be regarded as continuous in comparison with their diameters.

In general, the shear rate will be in the range of from about 50 to about 30,000 sec$^{-1}$. Preferably, the shear rate will be in the range of from about 150 to about 5,000 sec$^{-1}$, and most preferably from about 300 to about 2,000 sec$^{-1}$.

Throughput is of importance because it affects the time newly formed microfibers are in a sufficiently molten or fluid state to allow migration or segregation of the additive toward the newly formed surfaces, even though throughput also affects the shear rate.

Throughput typically will be in the range of from about 0.01 to about 6.4 kg/cm/hour. Preferably, throughput will be in the range from about 1.7 to about 5.4 kg/cm/hour. The throughput most preferably will be in the range of from about 2.3 to about 5.2 kg/cm/hour.

As used herein, the phrase "molten state" does not necessarily mean "flowable". Rather, the term is used to denote a condition of the thermoplastic composition in which the additive molecules still are capable of migrating or segregating to the surfaces of the newly formed microfibers. Thus, the term is somewhat imprecise and not readily subject to accurate measurement. Consequently, this composition fluidity factor preferentially is described or accounted for by the term "throughput".

The term "additive" is used throughout this specification and the claims to include a single compound or a mixture of two or more compounds. Moreover, the additive can be monomeric, oligomeric, or polymeric. The additive can be either a liquid or a solid.

The nature of the additive is not known to be critical, provided the additive (1) migrates to the surfaces of the microfibers of the second nonwoven web as they are formed during the melt-extrusion process and (2) imparts alcohol repellency to such microfibers.

Alcohol-repellent additives typically are fluorine-containing materials. Examples of fluorine-containing materials are the following:

Additive A

This additive is a perfluoroalkyl urethane, L-8977, which is available from 3M Company, St. Paul, Minnesota. The material is a white powder having a melting point of 130°–138° C. No other information regarding the material is available.

Additive B

This additive, identified by the manufacturer as L-8982, is similar to Additive A and is available from the same source. No information regarding the material is available.

Additive C

The additive, MPD-7901, available from DuPont (Wilmington, Delaware 19898), is a 2-perfluoroalkylethyl acetate. It has a melting point of 23°–24° C. and negligible solubility in water.

Additive D

This additive is a 2-perfluoroalkylethyl hexanoate, available from DuPont as MPD-7902. It has a melting point of 30°–50° C. and negligible solubility in water.

Additive E

Additive E is MPD-7903, available from DuPont. The material is an addition copolymer consisting of 85 mole-percent 2-perfluoroalkylethyl methacrylate and 15 mole-percent 2-diethylaminoethyl methacrylate. The material has negligible solubility in water.

Additive F

This additive, MPD-7708, is an addition copolymer of 2perfluoroalkylethyl methacrylate and 2-ethylhexyl methacrylate. The material is available from DuPont. It is a weakly acidic tacky solid having a melting point of 62°–72° C. The material is dispersible in water.

Additive G

The additive, MPD-7709, is available from DuPont and is a perfluoroalkyl-substituted urethane mixture. The material is a crystalline solid which is dispersible in water. It has a melting point of 88°–95° C.

Additive H

This additive is Telomer TM B Citrate or Zonyl®TBC, available from DuPont. The material is a 2-perfluoroalkylethyl citrate. It is waxy solid having a melting point of 50°–80° C. and negligible solubility in water. It has a specific gravity of 1.5 at 25° C.

Additive I

Additive I is Telomer TM B Citrate Urethane, available from DuPont.

Additive J

The additive, available from DuPont, is Zonyl TM FTS, a 2-perfluoroalkylethyl stearate. The material has a melting point of 30°–45° C., with negligible solubility in water.

Additive K

This additive is Zonyl TM TBS, available from DuPont. The material is a mixture of a 2-perfluoroalkylethylsulfonic acid and its ammonium salt.

Additive L

Additive L is Zonyl TM UR. The material, available from DuPont, is a 2-perfluoroalkylethylphosphate having an unknown cation.

Additive M

This additive is a fluorochemical urethane derivative, L-10307, from 3M Company, St. Paul, Minnesota. The material is a white powder having a melting point of 130°–138° C. No other information regarding the material is available.

As already noted, the additive preferentially migrates to the surfaces of the melt-extruded microfibers of the second nonwoven web as they are formed. Thus, the additive imparts alcohol repellency to the surfaces of such microfibers.

The nonwoven composite structure is pattern bonded by the application of heat and pressure. Preferably, such application of heat and pressure will be in the ranges of from about 120° C. to about 220° C. and from about 150 to about 1,000 pounds per linear inch (59–178 kg/cm), respectively. More preferably, a pattern having from about 10 to about 600 bonds/inch$^2$ (1–93 bonds/cm$^2$) covering from about 5 to about 30 percent of the composite structure surface area will be employed.

Such pattern bonding is accomplished in accordance with known procedures. See, for example, U. S. Design Pat. No. 239,566 to Vogt, U.S. Design Pat. No. 264,512 to Rogers, U.S. Pat. No. 3,855,046 to Hansen et al., and U.S. Pat. No. 4,493,868 to Meitner for illustrations of bonding patterns and a discussion of bonding procedures.

In general, the nonwoven composite structure of the present invention can be made by the method which comprises the steps of:

(A) forming a first nonwoven web by melt extruding continuous filaments which are randomly deposited on a moving foraminous support, such continuous filaments having an average filament diameter in excess of about 7 micrometers and being prepared from a first thermoplastic polymer which is selected from the group consisting of polyolefins, polyesters, polyetheresters, and polyamides;

(B) forming a second nonwoven web by melt extruding substantially continuous microfibers which are randomly deposited directly onto at least a portion of the first nonwoven web, such substantially continuous microfibers having an average diameter of from about 0.1 to about 10 micrometers;

(C) forming a third nonwoven web by melt extruding continuous filaments which are randomly deposited directly onto at least a portion of the second nonwoven web, such continuous filaments having an average filament diameter in excess of about 7 micrometers and being prepared from a first thermoplastic polymer which is selected from the group consisting of polyolefins, polyesters, polyetheresters, and polyamides;

(D) pattern bonding the resulting structure by the application of heat and pressure; and (E) treating at least one of the first and third nonwoven webs of the resulting pattern bonded structure by topical application of at least one agent in an amount which is sufficient to impart to the filaments of such web at least one characteristic which is different from the surface characteristics of filaments in a web not so treated, such topical treatment being carried out in a manner such that each topically applied agent is substantially restricted to the web to which it was applied; in which:

(1) the microfibers of the second nonwoven web are prepared by melt extrusion through a die at a shear rate of from about 50 to about 30,000 sec$^{-1}$ and a throughput of no more than about 6.4 kg/cm/hour of a mixture of an additive and a second thermoplastic polymer, which additive imparts alcohol repellency to the surfaces of the microfibers as a consequence of the preferential migration of the additive to the surfaces of the microfibers as they are formed, such preferential migration taking place spontaneously upon the formation of the microfibers without the need for a post-formation treatment of any kind;

(2) the additive is present in an amount which is sufficient to both impart alcohol repellency to the microfibers thereof and to substantially prevent entry into the second nonwoven web of topically applied treatment liquid; and (3) the second thermoplastic polymer is selected from the group consisting of polyolefins, polyesters, polyetheresters, and polyamides.

As indicated earlier, the formation of a melt-extruded nonwoven web is carried out by methods well known to those having ordinary skill in the art, such as by meltblowing, coforming, and spunbonding.

The sequential melt-extrusion of one or more additional nonwoven webs directly onto a first melt-extruded nonwoven web also can be carried out in accordance with known procedures. For example, the second and third nonwoven webs can be melt-extruded directly onto a first, preformed nonwoven web. Alternatively, the three nonwoven webs can be melt-extruded sequentially on a multiple-bank melt-extrusion apparatus. See, by way of example only, U.S. Pat. Nos. 4,714,647 to Shipp, Jr. et al., 4,761,322 to Raley, 4,766,029 to Brock et al., 4,778,460 to Braun et al., 4,784,892 to Maddern et al., 4,818,585 to Shipp, Jr., and 4,818,597 to DaPonte et al., each of which is incorporated herein by reference. The pattern bonding of the resulting structure then is accomplished as already described.

The foregoing method requires the second and third nonwoven webs to be melt extruded onto a first nonwoven web which can be preformed or formed immediately prior to the formation of the other two webs. As a matter of manufacturing convenience, however, it sometimes is desirable to use a preformed second nonwoven web. In this case, the method of the present invention involves the steps of:

(A) forming a first nonwoven web by melt extruding continuous filaments which are randomly deposited on a moving foraminous support, such continuous filaments having an average filament diameter in excess of about 7 micrometers and being prepared from a first thermoplastic polymer which is selected from the group consisting of polyolefins, polyesters, polyetheresters, and polyamides;

(B) placing a preformed second nonwoven web directly onto at least a portion of the first nonwoven web, such second nonwoven web having been formed by melt extruding substantially continuous microfibers which are randomly deposited, such substantially continuous microfibers having an average diameter of from about 0.1 to about 10 micrometers;

(C) forming a third nonwoven web by melt extruding continuous filaments which are randomly deposited directly onto at least a portion of the second nonwoven web, such continuous filaments having an average filament diameter in excess of about 7 micrometers and being prepared from a first thermoplastic polymer which is selected from the group consisting of polyolefins, polyesters, polyetheresters, and polyamides;

(D) pattern bonding the resulting structure by the application of heat and pressure; and (E) treating at least one of the first and third nonwoven webs by topical application of at least one agent in an amount which is sufficient to impart to the filaments of such web at least one characteristic which is different from the surface characteristics of filaments in a web not so treated, such topical treatment being carried out in a manner such that each topically applied agent is substantially restricted to the web to which it was applied; in which:

(1) the microfibers of the second nonwoven web are prepared by melt extrusion through a die at a shear rate of from about 50 to about 30,000 sec$^{-1}$ and a throughput of no more than about 6.4 kg/cm/hour of a mixture of an additive and a second thermoplastic polymer, which additive imparts alcohol repellency to the surfaces of the microfibers as a consequence of the preferential migration of the additive to the surfaces of the microfibers as they are formed, such preferential migration taking place spontaneously upon the formation of the microfibers without the need for a post-formation treatment of any kind;

(2) the additive is present in the second nonwoven web in an amount which is sufficient to both impart alcohol repellency to the microfibers thereof and to substantially prevent entry into the second nonwoven web of topically applied treatment liquid; and (3) the second thermoplastic polymer is selected from the group consisting of polyolefins, polyesters, polyetheresters, and polyamides.

As noted above, at least one of the first and third nonwoven webs is treated by the topical application of at least one agent. That is, depending on the use, it may not be necessary to treat both of such webs. For example, when the nonwoven composite structure of the present invention is to be used as a medical fabric, it typically is not necessary to treat the inside layer, i.e., the layer which is intended to be closest to the body.

If desired, however, both the first and third nonwoven webs can be independently treated. The term "independently treated" is used herein to mean that the first and third webs do not need to be treated in the same manner or even with the same agent. That is, it may be desirable or necessary to impart one characteristic to the filaments of the first web and a different characteristic to the surfaces of the filaments of the third web. As a practical matter, however, most often the same treatment procedure will be used for both webs and the agent or agents topically applied will be the same for both webs.

In general, examples of desired surface characteristics include, among others, hydrophilicity or water-wettability, alcohol repellency, hydrophobicity, antistatic properties, and the like. Antistatic properties sometimes are referred to herein as dissipation of electrostatic charge, and an antistatic agent is referred to as an antistat. The more desired characteristics are alcohol repellency and antistatic properties, which two characteristics often are desired in the same nonwoven web.

The topical application required by the present invention can be carried out by a variety of methods which are known to those having ordinary skill in the art, such as spraying, surface coating, printing, and the like. However, care must be taken to assure that each topically applied agent is substantially restricted to the web to which it was applied. For example, a dip and squeeze procedure typically cannot be used since the pressure of the nip rolls used to squeeze the structure forces topically applied treatment liquid from an outer layer into the center or second layer.

The topically applied treatment liquid generally will be an aqueous solution or dispersion but it is not required to be so. The solids content of the liquid is not known to be critical. A solids content of from about 0.5 to about 5 percent by weight perhaps is most convenient.

The amount of liquid applied to one or both of the first and third webs also is not known to critical, although a lower wet pick-up is preferred over a high wet pick-up. A wet pick-up of less than about 60 percent is more preferred.

The amount on a dry weight basis of each agent added to the first and third webs depends primarily on the effectiveness of the agent. By way of illustration, typical alcohol repellent agents and antistats can be applied at levels of from about 0.2 to about 0.5 percent by weight, based on the weight of the web.

With either method, the nature or type of alcohol repellent and antistats are not known to be critical, and a number of such agents are well known to those having ordinary skill in the art. As already noted, the alcohol repellent agents typically are fluorine-containing materials.

The present invention is further described by the example which follows. Such example, however, is not to be construed as limiting in any way either the spirit or scope of the present invention. In the example, all temperatures are in degrees Celsius and all parts are by weight unless stated otherwise.

EXAMPLE

A meltblown web having a basis weight of about 14 grams per square meter (g/m$^2$) was prepared from a mixture of 1.0 percent by weight titanium dioxide (SCC-7288, Standridge Color Corporation, Social Circle, Georgia 30279), 1.03 percent by weight blue pigment (SCC-7648, Standridge Color Corporation), 10 percent by weight of concentrate pellets consisting of 10 percent by weight Additive M and 90 percent by weight polypropylene (Escorene 3495G, Exxon Chemical Company, Polymers Group, Houston, Texas), 50 percent by weight of concentrate pellets consisting of 20 percent polybutylene prepared from 94 percent by weight butylene and 6 percent by weight ethylene and 80 percent by weight Escorene 3495G polypropylene, and 37.97 percent by weight Escorene 3495G polypropylene.

A spunbonded nonwoven web then was prepared from a mixture of 0.21 percent by weight blue pigment (SCC-4268, Standridge Color Corporation), 4.0 percent by weight Ampacet 41438 polypropylene (Ampacet Corporation, Tarrytown, New York 10591-5130), and Exxon 9355 polypropylene (Exxon Chemical Company). The web had a basis weight of about 20 g/m$^2$. The preformed meltblown web was placed over the spunbonded web immediately after the latter was formed, and a second 20 g/m$^2$ basis weight spunbonded web was formed on the meltblown web. The resulting composite structure was thermally bonded with a wire weave pattern at a temperature of about 143° C. to give a bonded nonwoven composite structure.

The resulting structure then was sprayed simultaneously on both sides with a treatment bath which consisted of 4.86 percent by weight of a stabilized perfluoroalkyl acrylic copolymer, i.e., stabilized Zonyl ® 7040 (DuPont), 1.50 percent of an alcohol phosphate salt antistatic agent, 0.25 percent by weight octanol, and the remainder water. Seventy-three degree fan-shaped nozzles delivering up to 0.023 gallons per minute per nozzle were employed. The pressure at the nozzles was 30 p.s.i.g. Wet pick-up was 40 percent by weight, based on the dry weight of the composite structure prior to the topical treatment. The line speed, or linear motion of the composite structure, was about 84 feet per minute (about 26 meters per minute).

The topically treated composite structure then was dried by passing the structure over six consecutive steam-heated cans having surface temperatures of about 104° C. The amount of alcohol repellent and antistatic agent applied to the two spunbonded layers by this topical application were 0.35 and 0.30 percent by weight, respectively, based on the dry weight of the composite structure prior to topical treatment.

The nonwoven composite structure of the present invention thus prepared exhibited good alcohol repellent and antistatic properties.

Having thus described the invention, numerous changes and modifications thereof will be apparent to those having ordinary skill in the art without departing from the spirit or scope of the invention.

What is claimed is:

1. An improved nonwoven composite structure having three melt-extruded nonwoven layers which comprises:
   (A) a first layer which comprises at least a portion of a first nonwoven web;
   (B) a second layer which comprises at least a portion of a second nonwoven web having a first surface and a second surface; and
   (C) a third layer which comprises at least a portion of a third nonwoven web; in which:
   (1) said first nonwoven web is adjacent to the first surface of said second nonwoven web and said third nonwoven web is adjacent to the second surface of said second nonwoven web;
   (2) said first nonwoven web is comprised of continuous and randomly deposited filaments having an average filament diameter in excess of about 7 micrometers and prepared from a first thermoplastic polymer which is selected from the group consisting of polyolefins, polyesters, polyetheresters, and polyamides;
   (3) said second nonwoven web is comprised of substantially continuous and randomly deposited microfibers having an average diameter of from about 0.1 to about 10 micrometers;
   (4) the microfibers of said second nonwoven web are prepared by melt extrusion through a die at a shear rate of from about 50 to about 30,000 sec$^{-1}$ and a throughput of no more than about 6.4 kg/cm/hour of a mixture of an additive and a second thermoplastic polymer, which additive imparts alcohol repellency to the surfaces of said microfibers as a consequence of the preferential migration of said additive to the surfaces of said microfibers as they are formed, said preferential migration taking place spontaneously upon the formation of said microfibers without the need for a post-formation treatment of any kind;
   (5) the additive is present in said second nonwoven web in an amount which is sufficient to both impart alcohol repellency to the microfibers thereof and to substantially prevent entry into said second nonwoven web of topically applied treatment liquid;
   (6) said second thermoplastic polymer is selected from the group consisting of polyolefins, polyesters, polyetheresters, and polyamides;
   (7) said third nonwoven web is comprised of continuous and randomly deposited filaments having an average filament diameter in excess of about 7 micrometers and prepared from a third thermoplastic polymer which is selected from the group consisting of polyolefins, polyesters, polyetheresters, and polyamides;
   (8) the boundary between at least two adjacent melt-extruded nonwoven layers is indistinct in that fibers at or near the surfaces of such adjacent layers are significantly intermingled;
   (9) said composite structure has been pattern bonded by the application of heat and pressure; and
   (10) at least one of said first and third nonwoven webs has been treated by topical application of at least one agent in an amount which is sufficient to impart to the filaments of said web at least one characteristic which is different from the surface characteristics of filaments in a web not so treated, said topical treatment being carried out in a manner such that each topically applied agent is substantially restricted to the web to which it was applied.

2. The nonwoven composite structure of claim 1, in which both of said first and third nonwoven webs have been independently treated by topical application of at least one agent in an amount which is sufficient to impart to the filaments of said webs at least one characteristic which is different from the surface characteristics of filaments in a web not so treated, said topical treatment being carried out in a manner such that each topically applied agent is substantially restricted to the web to which it was applied.

3. The nonwoven composite structure of claim 2, in which each of said first, second, and third thermoplastic polymers independently is selected from the group consisting of polyolefins.

4. The nonwoven composite structure of claim 3, in which each of said first, second, and third thermoplastic polymers is polypropylene.

5. The nonwoven composite structure of claim 2, in which both of said first and third nonwoven webs have been treated by the topical application of a mixture of two agents in an amount which is sufficient to impart to the filaments of each of said webs two distinct characteristics which are different from the surface characteristics of filaments in a web not so treated.

6. The nonwoven composite structure of claim 5, in which said two agents are an alcohol repellent and an antistat.

7. The nonwoven composite structure of claim 2, in which said composite structure has been pattern bonded by the application of heat and pressure in the ranges of from about 120° C. to about 220° C. and from about 150 to about 1,000 pounds per linear inch (59-178 kg/cm), respectively, employing a pattern with from about 10 to about 600 bonds/inch$^2$ (1-93 bonds/cm$^2$) covering from about 5 to about 30 percent of the nonwoven composite structure surface area.

8. The nonwoven composite structure of claim 2, in which said composite structure consists essentially of a central polypropylene meltblown layer sandwiched between two polypropylene spunbonded layers, in which:

(A) said meltblown layer contains an additive which renders the fibers alcohol repellent; and (B) said spunbonded layers have been treated by topical application of a mixture of two agents in an amount which is sufficient to impart to the filaments of each of said layers two distinct characteristics which are different from the surface characteristics of filaments in a web not so treated.

9. The nonwoven composite structure of claim 8, in which said two agents are an alcohol repellent and an antistat.

10. The nonwoven composite structure of claim 9, in which said composite structure has been pattern bonded by the application of heat and pressure in the ranges of from about 120° C. to about 220° C. and from about 150 to about 1,000 pounds per linear inch (59–178 kg/cm), respectively, employing a pattern with from about 10 to about 600 bonds/inch$^2$ (1–93 bonds/cm$^2$) covering from about 5 to about 30 percent of the nonwoven composite structure surface area.

11. A method of preparing a nonwoven composite structure having three melt-extruded nonwoven layers adjacent to each other in which each melt-extruded nonwoven layer comprises at least a portion of a nonwoven web and the boundary between any two adjacent melt-extruded nonwoven layers is indistinct in that fibers or filaments at or near the surfaces of such adjacent layers are significantly intermingled, which method comprises the steps of:

(A) forming a first nonwoven web by melt extruding continuous filaments which are randomly deposited on a moving foraminous support, said continuous filaments having an average filament diameter in excess of about 7 micrometers and being prepared from a first thermoplastic polymer which is selected from the group consisting of polyolefins, polyesters, polyetheresters, and polyamides;

(B) forming a second nonwoven web by melt extruding substantially continuous microfibers which are randomly deposited directly onto at least a portion of said first nonwoven web, said substantially continuous microfibers having an average diameter of from about 0.1 to about 10 micrometers;

(C) forming a third nonwoven web by melt extruding continuous filaments which are randomly deposited directly onto at least a portion of said second nonwoven web, said continuous filaments having an average filament diameter in excess of about 7 micrometers and being prepared from a first thermoplastic polymer which is selected from the group consisting of polyolefins, polyesters, polyetheresters, and polyamides;

(D) pattern bonding the resulting structure by the application of heat and pressure; and (E) treating at least one of said first and third nonwoven webs of the resulting pattern bonded structure by topical application of at least one agent in an amount which is sufficient to impart to the filaments of said web at least one characteristic which is different from the surface characteristics of filaments in a web not so treated, said topical treatment being carried out in a manner such that each topically applied agent is substantially restricted to the web to which it was applied; in which:

(1) the microfibers of said second nonwoven web are prepared by melt extrusion through a die at a shear rate of from about 50 to about 30,000 sec$^{-1}$ and a throughput of no more than about 6.4 kg/cm/hour of a mixture of an additive and a second thermoplastic polymer, which additive imparts alcohol repellency to the surfaces of said microfibers as a consequence of the preferential migration of said additive to the surfaces of said microfibers as they are formed, said preferential migration taking place spontaneously upon the formation of said microfibers without the need for a post-formation treatment of any kind;

(2) the additive is present in said second nonwoven web in an amount which is sufficient to both impart alcohol repellency to the microfibers thereof and to substantially prevent entry into said second nonwoven web of topically applied treatment liquid; and (3) said second thermoplastic polymer is selected from the group consisting of polyolefins, polyesters, polyetheresters, and polyamides.

12. The method of claim 11, in which both of said first and third nonwoven webs have been independently treated by topical application of at least one agent in an amount which is sufficient to impart to the filaments of said webs at least one characteristic which is different from the surface characteristics of filaments in a web not so treated, said topical treatment being carried out in a manner such that each topically applied agent is substantially restricted to the web to which it was applied.

13. The method of claim 12, in which each of said first, second, and third thermoplastic polymers independently is selected from the group consisting of polyolefins.

14. The method of claim 12, in which each of said first, second, and third thermoplastic polymers is polypropylene.

15. The method of claim 12, in which both of said first and third nonwoven webs have been treated by the topical application of a mixture of two agents in an amount which is sufficient to impart to the filaments of each of said webs two distinct characteristics which are different from the surface characteristics of filaments in a web not so treated.

16. The method of claim 15, in which said two agents are an alcohol repellent and an antistat.

17. The method of claim 12, in which said nonwoven composite structure has been pattern bonded by the application of heat and pressure in the ranges of from about 120° C. to about 220° C. and from about 150 to about 1,000 pounds per linear inch (59–178 kg/cm), respectively, employing a pattern ( with from about 10 to about 600 bonds/inch$^2$ (1–93 bonds/cm$^2$) covering from about 5 to about 30 percent of the nonwoven composite structure surface area.

18. A method of preparing a nonwoven composite structure having three melt-extruded nonwoven layers adjacent to each other in which each melt-extruded nonwoven layer comprises at least a portion of a nonwoven web and the boundary between at least two adjacent melt-extruded nonwoven layers is indistinct in that fibers or filaments at or near the surfaces of such adjacent layers are significantly intermingled, which method comprises the steps of:

(A) forming a first nonwoven web by melt extruding continuous filaments which are randomly deposited on a moving foraminous support, said continuous filaments having an average filament diameter in excess of about 7 micrometers and being prepared from a first thermoplastic polymer which is selected from the group consisting of polyolefins, polyesters, polyetheresters, and polyamides;

(B) placing a preformed second nonwoven web directly onto at least a portion of said first nonwoven web, said second nonwoven web having been formed by melt extruding substantially continuous microfibers which are randomly deposited, said substantially continuous microfibers having an average diameter of from about 0.1 to about 10 micrometers;

(C) forming a third nonwoven web by melt extruding continuous filaments which are randomly deposited directly onto at least a portion of said second nonwoven web, said continuous filaments having an average filament diameter in excess of about 7 micrometers and being prepared from a first thermoplastic polymer which is selected from the group consisting of polyolefins, polyesters, polyetheresters, and polyamides;

(D) pattern bonding the resulting structure by the application of heat and pressure; and (E) treating at least one of said first and third nonwoven webs of the resulting pattern bonded structure by topical application of at least one agent in an amount which is sufficient to impart to the filaments of said web at least one characteristic which is different from the surface characteristics of filaments in a web not so treated, said topical treatment being carried out in a manner such that each topically applied agent is substantially restricted to the web to which it was applied; in which:

(1) the microfibers of said second nonwoven web are prepared by melt extrusion through a die at a shear rate of from about 50 to about 30,000 sec$^{-1}$ and a throughput of no more than about 6.4 kg/cm/hour of a mixture of an additive and a second thermoplastic polymer, which additive imparts alcohol repellency to the surfaces of said microfibers as a consequence of the preferential migration of said additive to the surfaces of said microfibers as they are formed, said preferential migration taking place spontaneously upon the formation of said microfibers without the need for a post-formation treatment of any kind;

(2) the additive is present in said second nonwoven web in an amount which is sufficient to both impart alcohol repellency to the microfibers thereof and to substantially prevent entry into said second nonwoven web of topically applied treatment liquid; and (3) said second thermoplastic polymer is selected from the group consisting of polyolefins, polyesters, polyetheresters, and polyamides.

19. The method of claim 18, in which both of said first and third nonwoven webs have been independently treated by topical application of at least one agent in an amount which is sufficient to impart to the filaments of said webs at least one characteristic which is different from the surface characteristics of filaments in a web not so treated, said topical treatment being carried out in a manner such that each topically applied agent is substantially restricted to the web to which it was applied.

20. The method of claim 19, in which each of said first, second, and third thermoplastic polymers independently is selected from the group consisting of polyolefins.

21. The method of claim 20, in which each of said first, second, and third thermoplastic polymers is polypropylene.

22. The method of claim 19, in which both of said first and third nonwoven webs have been treated by the topical application of a mixture of two agents in an amount which is sufficient to impart to the filaments of each of said webs two distinct characteristics which are different from the surface characteristics of filaments in a web not so treated.

23. The method of claim 22, in which said two agents are an alcohol repellent and an antistat.

24. The method of claim 19, in which said nonwoven composite structure has been pattern bonded by the application of heat and pressure in the ranges of from about 120° C. to about 220° C. and from about 150 to about 1,000 pounds per linear inch (59–178 kg/cm), respectively, employing a pattern with from about 10 to about 600 bonds/inch$^2$ (1–93 bonds/cm$^2$) covering from about 5 to about 30 percent of the nonwoven composite structure surface area.

* * * * *

UNITED STATES PATENT AND TRADEMARK OFFICE
CERTIFICATE OF CORRECTION

PATENT NO. : 5,178,932

DATED : January 12, 1993

INVENTOR(S) : Cheryl A. Perkin, et al

It is certified that error appears in the above-identified patent and that said Letters Patent is hereby corrected as shown below:

Column 5, line 34, "spunbonding references..." should read --(c) spunbonding references...--;

Column 6, line 17, "poly(,-caprolactam), poly(..." should read --poly($\epsilon$-caprolactam), poly(...--;

Column 10, line 5 & 6, "is present in an amount which..." should read --is present in the second nonwoven web in an amount...--;

Signed and Sealed this

Fifteenth Day of February, 1994

Attest:

BRUCE LEHMAN

*Attesting Officer*  Commissioner of Patents and Trademarks